United States Patent
Yeung

(10) Patent No.: US 7,169,884 B2
(45) Date of Patent: Jan. 30, 2007

(54) SILICONE MATERIAL, ITS PREPARATION METHOD AND USE THEREOF

(75) Inventor: Ricky K. C. Yeung, Hong Kong (CN)

(73) Assignee: SAR Holdings International Ltd. (CN)

( * ) Notice: Subject to any disclaimer, the term of this patent is extended or adjusted under 35 U.S.C. 154(b) by 0 days.

(21) Appl. No.: 10/482,638

(22) PCT Filed: Jun. 28, 2001

(86) PCT No.: PCT/CN01/01064

§ 371 (c)(1),
(2), (4) Date: Jul. 15, 2004

(87) PCT Pub. No.: WO03/002670

PCT Pub. Date: Jan. 9, 2003

(65) Prior Publication Data

US 2004/0249089 A1    Dec. 9, 2004

(51) Int. Cl.
*C08L 77/04* (2006.01)
(52) U.S. Cl. .................. 528/477; 528/15; 528/24; 528/31; 528/32
(58) Field of Classification Search ............. None
See application file for complete search history.

(56) References Cited

U.S. PATENT DOCUMENTS

| | | | |
|---|---|---|---|
| 4,427,801 A * | 1/1984 | Sweet | 523/212 |
| 4,863,666 A | 9/1989 | Primas et al. | |
| 4,889,576 A | 12/1989 | Suganuma et al. | |
| 4,912,188 A | 3/1990 | Colas et al. | |
| 5,006,372 A | 4/1991 | Wolfer et al. | |
| 5,023,288 A | 6/1991 | Hirai et al. | |
| 5,082,886 A * | 1/1992 | Jeram et al. | 524/403 |
| 5,373,078 A * | 12/1994 | Juen et al. | 528/15 |
| 5,384,384 A | 1/1995 | Inoue et al. | |
| 5,429,872 A | 7/1995 | Nakamura et al. | |
| 6,072,012 A * | 6/2000 | Juen et al. | 525/478 |
| 6,562,180 B1 | 5/2003 | Bohin et al. | |

FOREIGN PATENT DOCUMENTS

| | | |
|---|---|---|
| EP | 0239099 A2 | 9/1987 |
| EP | 0851000 A2 | 7/1998 |
| JP | 11 021544 A | 1/1999 |

* cited by examiner

*Primary Examiner*—Marc S. Zimmer
(74) *Attorney, Agent, or Firm*—Jones Day

(57) ABSTRACT

The present invention relates to a novel silicone rubber material. The feedstocks for preparing the silicone rubber are a crosslinkable siloxane, a methylsiloxane resin and a cross-linking agent. This material is in solid state and has a high adhesivity. The present invention further relates to a process for preparing said silicone rubber material and uses in the area of self-adhesives with skid-prevention.

10 Claims, No Drawings

SILICONE MATERIAL, ITS PREPARATION METHOD AND USE THEREOF

TECHNICAL FIELD

The present invention relates to a novel silicone rubber in a solid state and has a high adhesivity. The present invention relates to a process for preparing said silicone rubber material in skid-preventing self-adhesives.

TECHNICAL BACKGROUND

The prior art only disclosed flowing or liquid state pressure sensitive silicone resins adhesives. Such adhesives are inconvenient in use and difficult to maintain a uniform thickness. JP 62225580 disclosed a process for coating pressure sensitive silicone resins adhesives to a substrate U.S. Pat. No. 5,023,288 further disclosed a process for coating the pressure sensitive silicone resins adhesives to a substrate, which aimed at improving the tensile strength of the pressure sensitive silicone resins adhesives so as to obtain thinner pressure sensitive silicone resins adhesives coating material. From the foregoing prior art, it can be seen that use of the pressure sensitive silicone resins adhesives are presently limited to coating onto a substrate and then making the coated substrate into a rubber belt form. When the pressure sensitive silicone resins adhesives are used independently, they are always used in a liquid form. In U.S. Pat. No. 4,889,576, a process using a pressure sensitive silicone resins adhesives to bind textiles coated with silicone rubber is disclosed. In this case, textiles coated with silicone rubber may be made by press-rolling, knife coating or dip coating a silicone rubber composition, followed by thermo-curing or standing at room temperature. The pressure sensitive silicone resins adhesives consist of a polysiloxane having two organic groups which are able to form linkage with silicon, an organo-hydropolysiloxane, Pt-catalyst and an intensifier filler; or they may consist of a polysiloxane having two organic groups, an organic peroxide and an intensifier. In this patent, the fibers coated with silicone rubber were superimposed with the pressure sensitive silicone resins adhesives, followed by press-adhesion and thermo-curing.

In conclusion, so far no solid silicone rubber having self-adhesivity has been reported in the prior art. However, the present invention opens up a completely new area in that by using the technical solution of the present invention, a solid silicone rubber having self-adhesivity can be prepared. As such silicone rubber possesses adhesivity as well as a solid form, its application prospect is extensive.

OBJECTS OF THE INVENTION

One object of the present invention is to provide a solid silicone rubber material having high adhesivity.

Another object of the present invention is to provide a process for preparing said silicone rubber material.

Yet another object of the present invention is to provide the use of the silicone rubber material product prepared according to the process of the present invention in the field of skid-preventing self-adhesives.

SUMMARY OF THE INVENTION

According to the present invention, a solid silicone rubber material having high adhesivity is obtained unexpectedly by mixing and reacting a commercially available siloxane silica gel raw material, a methylsiloxane resin and a cross-linking agent. The Inventors further found that the silicone rubber prepared according to the process of the present invention shows skid-preventing and self-adhesive performance that an article, which sliding is undesirable, can be placed on the silicone rubber which may prevent the said sliding.

DETAILED DESCRIPTION OF THE INVENTION

The present invention relates to a novel silicon rubber.

The feedstocks for preparing the silicone rubber comprise a diorgano polysiloxane with an alkenyl which is able to link silicon, a methylsiloxane resin and a peroxide cross-linking agent or a cross-linking agent comprising Pt and an organo-hydropolysiloxane. A solid silicone rubber material having high adhesivity is obtained unexpectedly by mixing and reacting the feedstocks mentioned above.

The followings explain the present invention in detail.

Said diorgano polysiloxane with an alkenyl which is able to link silicon is preferably dimethylvinyl siloxane silica gel with a polymerization degree preferably of 7000–8000.

Examples of organo-hydropolysiloxane cross-linking agents include:

Trimethylsiloxy-terminated methylhydropolysiloxane,

Trimethylsiloxy-terminated dimethylsiloxane-methylhydrosiloxane copolymer,

Dimethylphenylsiloxy-terminated methylphenylsiloxane methylhydrosiloxane copolymer.

The organo-hydropolysiloxanes preferably have the following structure:

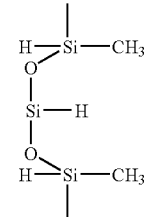

The methylsiloxane resins used in the present invention are commercially available. Preferably, the following methylsiloxane resins with a reticulate structure and a polymerization degree preferably of 7000–8000, is used in the present invention,

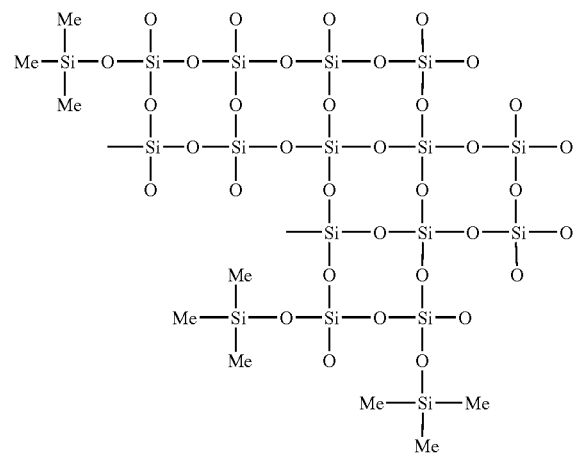

Examples of Pt-catalysts include platinum black, chloroplatinic acid, platinum tetrachloride, a complex of chloroplatinic acid-olefins, a complex of chloroplatinic acid-methylvinyl siloxane and the like.

Said peroxides comprise benzoyl peroxide, di-(2,4-dichlorobenzoyl) peroxide, dicumyl peroxide, di-tert-butyl peroxide, p-monochlorobutyl peroxide, 2,5-dimethyl-2,5-di-tert-butylperoxy hexane, di-tert-butylperoxy peroxide, 2,5-dimethyl-2,5-bis(tert-butylperoxy) hexane and tert-butyl-cumyl peroxide. Preferred cross-linking agent is 2,5-dimethyl-2,5-di-tert-butylperoxy hexane, more preferred cross-linking agents are commercially-available cross-linking agents with trade names C-8, C-8A or C-8B and produced by Shin-Etsu Silicone Corp., Japan. The cross-linking agent is used in an amount of 0.3–4% by weight based on the weight of other feedstocks.

The process for preparing the compound of the present invention is as follows:

Reaction route A: dimethylvinyl siloxane silica gel+peroxide+methylsiloxane resin→product;

Reaction route B: dimethylvinyl siloxane silica gel+organo-hydropolysiloxane+methylsiloxane resin $\xrightarrow{Pt}$ product.

The molding method of the silicone rubber in the present invention is specifically as follows:

Compression molding method: refers to a molding method which is conducted by using a common oil press under a molding pressure of 150–220 tons and the die is locked at a temperature of 120–280° C. The locking time of the die is about 200–2000 second depending upon different yardage of the die for molding the formulation through reaction.

Injection molding method: refers to a molding method which is conducted by using an injection machine under a pressure of 20–200 kg at a temperature of 150–280° C. for about 100–1000 seconds.

Hot-air curing: refers to a molding method by kneading the feedstocks with multiple roll wheels, then transferring the kneaded blend into an oven at 100–300° C. in a given thickness and molding it for 100–600 seconds.

The product of the present invention is obtained by molding the conventional silicone rubber and a cross-linking agent according to one of the methods mentioned above, then baking the molded product at 200° C. for 4 hours.

The silicone rubber prepared according to the process of the present invention has such skid-preventing and self-adhesive performance that an article, which sliding is undesirable, can be placed on the silicone rubber which may prevent the said sliding. The silicone rubber can achieve good adhesion with common portable telephone, sunglasses, cosmetics, paper tape, letter, photograph or photograph frame and the like, and also can be put onto dashboard of car, doors of chest freezer, computer screen or walls of lavatory.

EXAMPLES

Example 1

100 weight parts of dimethylvinyl siloxane silica gel, 2 weight parts of C-8 and 10 weight parts of methylsiloxane resin were mixed uniformly, then press-vulcanized by using a conventional compression molding method at 165° C. for 10 minutes, and baked at 200° C. for 4 hours to obtain the present invention product.

Example 2

100 weight parts of dimethylvinyl siloxane silica gel, 0.5 weight parts of C-8 A and 10 weight parts of methylsiloxane resin were mixed uniformly, then press-vulcanized by using a conventional compression molding method at 165° C. for 10 minutes, and baked at 200° C. for 4 hours to obtain the present invention product.

Example 3

100 weight parts of dimethylvinyl siloxane silica gel, 1 weight part of C-8B and 10 weight parts of methylsiloxane resin were mixed uniformly, then press-vulcanized by using a conventional compression molding method at 165° C. for 10 minutes, and baked at 200° C. for 4 hours to obtain the present invention product.

Example 4

100 weight parts of dimethylvinyl siloxane silica gel, 3 weight parts of C-8 and 10 weight parts of methylsiloxane resin were mixed uniformly, then press-vulcanized by using a conventional compression molding method at 165° C. for 5 minutes, and baked at 200° C. for 4 hours to obtain the present invention product.

Example 5

100 weight parts of dimethylvinyl siloxane silica gel, 2 weight parts of C-8 and 10 weight parts of methylsiloxane resin were mixed uniformly, then press-vulcanized by using a conventional injection molding method at 165° C. for 10 minutes, and baked at 200° C. for 4 hours to obtain the present invention product.

Example 6

100 weight parts of dimethylvinyl siloxane silica gel, 2 weight parts of C-8 and 10 weight parts of methylsiloxane resin were mixed uniformly, then press-vulcanized by using a hot-air curing method at 165° C. for 10 minutes, and baked at 200° C. for 4 hours to obtain the present invention product.

Example 7

100 weight parts of dimethylvinyl siloxane silica gel, 1.5 weight parts of C-3 and 10 weight parts of methylsiloxane resin were mixed uniformly, then press-vulcanized by using a conventional hot-air curing method at 155° C. for 10 minutes, and baked at 200° C. for 4 hours to obtain the present invention product.

Example 8

100 weight parts of dimethylvinyl siloxane silica gel, 0.5 weight parts of organo-hydropolysiloxane and Pt, 2.5 weight parts of C-19 (containing HC≡C compound inhibitor having a structure formula R1C≡CR2, wherein R1 and R2 are reactive free radicals, ex. Japan Shin-Etsu Silicone Corp.) and 10 weight parts of methylsiloxane resin were mixed uniformly, then press-vulcanized by using a conventional compression molding method at 120° C. for 10 minutes, and baked at 200° C. for 4 hours to obtain the present invention product.

Unexpectedly, the silicone rubber materials of the present invention have very strong adhesivity. Furthermore, the silicone rubber materials of the present invention have different superior performances, depending upon the different hardnesses of feedstocks selected, as those shown in Table 1 (based on Shore A 30 degree of hardness):

TABLE 1

| Experimental item | Specification |
|---|---|
| Specific gravity (23 ± 2° C.) | 1.05–1.15 |
| Hardness (Hardometer A) | 30 ± 10 |
| Tonsile strength (MPa) | ≧1 |
| Elongation (%) | ≧400 |
| Tearing strength (Crescent A KN/m) | ≧2 |

What is claimed is:

1. A silicone rubber material product prepared by mixing, reacting and molding feedstocks comprising a diorgano polysiloxane with an alkenyl which is able to link silicon, methylsiloxane resin and a cross-linking agent, wherein said methylsiloxane resin has a polymerization degree of 7000–8000.

2. The product according to claim 1, wherein the methylsiloxane resin has a reticulate structure as follows:

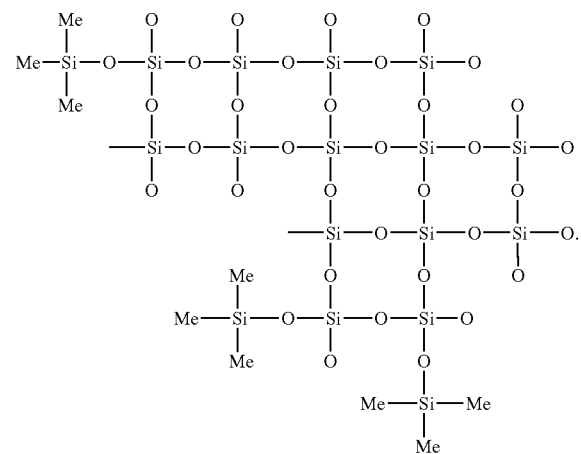

3. The product according to claims 1 or 2, wherein said cross-linking agent is a peroxide.

4. The product according to claim 3, wherein said cross-linking agent is 2,5-dimethyl-2,5-di-tert-butylperoxy hexane.

5. The product according to claims 1 or 2, wherein said cross-linking agent is an organo-hydropolysiloxane comprising a platinum-containing catalyst.

6. The product according to claims 1 or 2, wherein said cross-linking agent is used in an amount of 0.3–4% by weight based on the total weight of the diorgano polysiloxane with an alkenyl which is able to link silicon and the methylsiloxane resin feedstocks.

7. A skid-preventing and self-adhesive product comprising the product according to claim 1.

8. The product according to claim 7, which can achieve good adhesion to a telephone, sunglass, cosmetics, paper tape, letter, photograph, photo frame, an article which can be put onto a dashboard of a car, a door of a freezer, a computer screen or walls of a lavatory.

9. A method for reaction-molding the product of claims 1 or 2, said method comprising a compression molding step, an injection molding step, or a hot-air curing molding step.

10. The method of claim 9, further comprising a press-vulcanizing and baking step.

* * * * *